May 28, 1957 M. E. GAYNES 2,793,457
FISHING LURE RETRIEVER
Filed Aug. 23, 1955
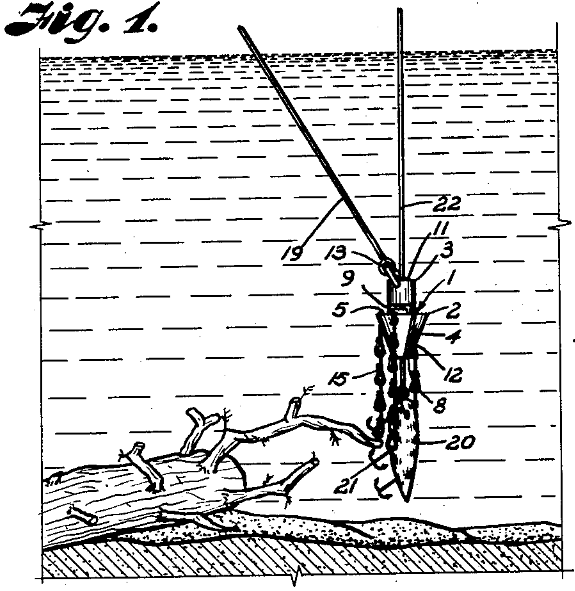
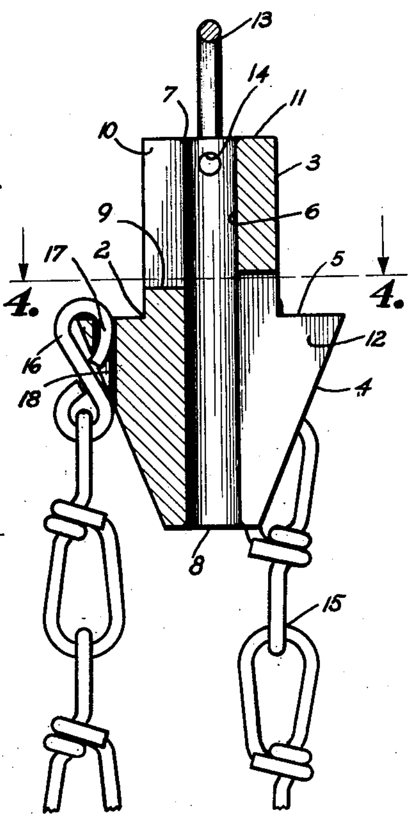
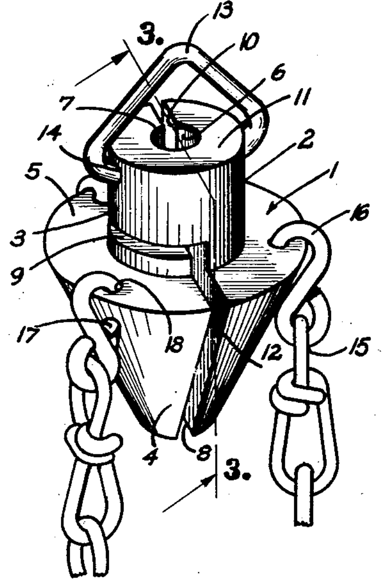
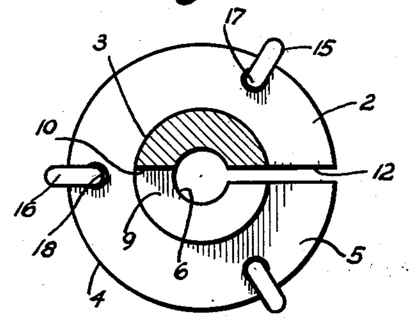
INVENTOR.
Miles E. Gaynes.
BY
Fishburn & Mullendore
ATTORNEYS.

United States Patent Office 2,793,457 Patented May 28, 1957

1

2,793,457

FISHING LURE RETRIEVER

Miles E. Gaynes, Kansas City, Mo.

Application August 23, 1955, Serial No. 530,176

2 Claims. (Cl. 43—17.2)

This invention relates to a new and improved fishing lure retriever, and more particularly to a device for use with fishing lines to dislodge and release fish hook assemblies of lures at one end thereof which have become snagged or fouled below the water level.

Many fishing waters have stumps, tree limbs and other obstructions under the water, and it is frequently desirable to manipulate a lure at depths where such obstructions, rocks and the like, are encountered, with the result that the hook assembly of the lure becomes snagged or caught under the water upon an object or obstruction from which it is difficult and inconvenient to release the same manually. It frequently is possible to free the hook assembly of the lure from the retaining object if the lure can be forced in the opposite direction from which it was moving at the time it became snagged on the obstruction.

The objects of the present invention are to provide an improved retrieving device for lowering down a fishing line to engage and release a fouled plug in a manner that makes unnecessary any pulling on the fouled line that might cause the same to break and the plug be lost; to provide such a lure retriever with a body having a novel slot arrangement for placing the retriever on the line intermediate the length thereof and which prevents the retriever leaving the line until the line is wilfully disengaged from the retriever; to provide such a lure retriever with a plurality of flexible members of loosely connected links having loops adapted to become entangled with the hook assemblies for pulling the lure from the object with which it is snagged; to provide a fishing lure retriever of substantial weight and advantageous distribution of mass for implementing the retriever and releasing lures from snags; and to provide a fishing lure retriever which is simple in form, adapted to be manufactured at low cost, is easily applied to a fishing line and is highly efficient in releasing fishing lures from underwater snags.

In accomplishing these and other objects of the present invention, I have provided improved details of structure, the preferred form of which is illustrated in the accompanying drawings, wherein:

Fig. 1 is an elevational view showing the fishing lure retriever in use.

Fig. 2 is a perspective view of the lure retriever.

Fig. 3 is a vertical sectional view through the retriever taken on the line 3—3, Fig. 2.

Fig. 4 is a transverse sectional view through the retriever taken on the line 4—4, Fig. 3.

Referring more in detail to the drawings:

1 designates a fishing lure retriever which includes, a body member 2 of suitable mass or weight to cause it to sink readily into water. The body member is preferably formed of relatively heavy metal, such as lead or suitable alloys thereof, with a weight in the order of four ounces. The body member 2 preferably has an elongate cylindrical upper section or neck 3 and a conically tapered lower section 4. In the illustrated structure, the upper and lower sections 3 and 4 respectively are approximately the same length with the upper portion of the lower section or large diameter of same being approximately twice the diameter of the upper section 3 and sloping downwardly and inwardly toward the lower end of the body member whereby the top of the bottom section presents a flat face or shoulder 5.

The body member has a preferably cylindrical bore 6 extending therethrough with the ends of the bore flared or beveled as at 7 to reduce wear on a fishing line or the like on which the body member may be sleeved. The bore 6 is preferably smaller in diameter than the lower end of the bottom section 4 to provide a striking face 8.

The cylindrical upper section 3 has a transverse slot 9 spaced slightly above the face 5 and in a plane transversely of and perpendicular to the axis of the bore 6, the slot 9 extending approximately half way through the upper section 3 and opening into the bore 6. A vertical slot 10 extends from the upper end 11 of the upper section 3 to the slot 9 and from the outer surface to the bore 6. A vertical slot 12 is arranged in the lower section 4 in opposed or angular relation to the slot 10 and extends from the outer surface of the body to the bore 6 and from the end face 8 to the slot 9. An eye member 13 is suitably secured to the upper section 3 and preferably consists of a wire having inturned ends rotatably mounted in sockets 14 extending in diametrically opposed relation into the upper portion adjacent the end 11 thereof.

A plurality of flexible members such as chains 15 having loosely connected links are secured to the upper portion of the body member section 4. In the illustrated structure, there are three short lengths of chains, the upper links 16 of which have portions 17 extending through bores 18 that extend from the face 5 downwardly and open in the sloping face of section 4 in spaced relation to the upper end of the lower section of the body member. The links of chain are preferably twice the length of the body member.

A retrieving line 19 has one end secured to the eye member 13, and when not in use the retrieving line may be wound around the upper section 3 of the body member.

In operation, when a fish lure 20 becomes snagged as by having a hook assembly 21 thereon hooked to a stump, tree limb or the like, the retrieving line 19 is unwound from the body section 3 and the fishing line 22 is passed through the slots 9, 10 and 12 to move the fishing line into the bore 6 whereby said fishing line serves as a guide on which to lower the retrieving device to the vicinity of the snagged fish lure 20. When the body member approaches the lure, it is quickly lowered whereby the body member will strike the plug and the first impact may be sufficient to release the hook assembly from the snag. If the first impact against the lure is not sufficient, the retriever can be pulled up by the line 19 and then released for further impact against the plug until the lure is dislodged and is carried positively downwardly away from the obstruction by the weight of the retrieving device. If the impacts of the retrieving device fail to release the lure from the snag, the up and down movement of the retrieving device will cause an agitation of the chains 15 and entanglement of the chains with the hook assemblies of the lure. Then by moving in the direction opposite that in which the lure was moving when it became snagged and applying a strong pull to the retrieving line 19 the lure may be forcibly pulled from the snag, and then the lure and retriever pulled aboard the boat and the fishing line 22 moved through the slots 9, 10 and 12 to release the line from the retrieving device and the chains 15 released from the hook assemblies.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A fishing lure retriever for use with a fishing line having a snagged lure at one of its ends comprising, an elongate body member substantially symmetrical about a longitudinal axis thereof and having a cylindrical upper section and an enlarged lower section of substantially conical shape tapering toward the lower end of the body member, said lower section having an upwardly facing shoulder adjacent the upper section, said body member having an axial bore extending longitudinally therethrough, said body member having a slot extending throughout its length and opening into the bore of the body, said slot having angularly disposed portions in the upper and lower portions and a transverse portion in the upper section adjacent said shoulder and connecting the adjacent ends of the angularly disposed portions whereby a fishing line may be moved through the slots into the bore and serve as a guide for lowering said body member, means on the upper section of the body member for connecting a retriever line thereto for raising and lowering the body member along the fishing line, a plurality of lengths of chain formed of loosely connected links, and means securing one end of each of said chains to the lower section of the body member adjacent the shoulder and in radially spaced relation whereby the chains hang loose therefrom.

2. A fishing lure retriever for use with a fishing line having a snagged lure at one of its ends comprising, an elongate body member substantially symmetrical about a longitudinal axis thereof and having a lower portion of substantially conical shape tapering toward the lower end of the body member and an upstanding cylindrical upper portion axial thereof, said cylindrical upper portion being of smaller diameter than the adjacent end of the lower portion forming an upwardly facing shoulder thereon, said body member having an axial bore extending longitudinally therethrough, said body member having a longitudinal slot in the upper portion opening into the bore and a longitudinal slot extending throughout the length of the lower portion and opening into the bore on the opposite side thereof from the slot in the upper portion, and a transverse slot in the upper portion adjacent the shoulder and opening into the bore and communicating with the adjacent ends of the longitudinal slots whereby a fishing line may enter the bore and serve as a guide for lowering said body member, a loop-like member connected to the upper portion of the body member and forming an eye for attaching a retriever line thereto for raising and lowering the body member, said lower portion of the body member having a plurality of bores equally spaced therearound and extending downwardly from the shoulder and opening in the sloping face of said lower portion in spaced relation to said shoulder, a plurality of lengths of chain formed of loosely connected links, and means at the upper end of each of said chain lengths extending into said bores in the lower portion of the body member for supporting said chain lengths on said body member whereby said chains hang loose therefrom.

References Cited in the file of this patent

UNITED STATES PATENTS

| | | |
|---|---|---|
| 231,417 | Foote | Aug. 24, 1880 |
| 2,482,037 | Swaim | Sept. 13, 1949 |
| 2,526,031 | Kocarek | Oct. 17, 1950 |
| 2,534,790 | Moore | Dec. 19, 1950 |
| 2,764,833 | Clark | Oct. 2, 1956 |